United States Patent
Moiyallah, Jr. et al.

(10) Patent No.: US 10,327,139 B2
(45) Date of Patent: Jun. 18, 2019

(54) MULTI-LEVEL AUTHENTICATION USING PHONE APPLICATION LEVEL DATA

(71) Applicant: BANK OF AMERICA CORPORATION, Charlotte, NC (US)

(72) Inventors: Samuel Massa Moiyallah, Jr., Newark, DE (US); Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 50 days.

(21) Appl. No.: 15/287,557

(22) Filed: Oct. 6, 2016

(65) Prior Publication Data

US 2018/0103020 A1    Apr. 12, 2018

(51) Int. Cl.
  *H04W 12/06*  (2009.01)
  *H04L 29/06*  (2006.01)

(52) U.S. Cl.
  CPC ............ *H04W 12/06* (2013.01); *H04L 63/08* (2013.01)

(58) Field of Classification Search
  CPC ....... H04L 63/08; H04L 63/102; H04W 12/06
  See application file for complete search history.

(56) References Cited

U.S. PATENT DOCUMENTS

| | | |
|---|---|---|
| 6,496,936 B1 | 12/2002 | French et al. |
| 6,857,073 B2 | 2/2005 | French et al. |
| 7,234,156 B2 | 6/2007 | French et al. |
| 7,571,472 B2 | 8/2009 | Royer |
| 8,108,517 B2 | 1/2012 | Kalavade |
| 8,112,817 B2 | 2/2012 | Chiruvolu et al. |
| 8,135,180 B2 | 3/2012 | Baltatu et al. |
| 8,195,661 B2 | 6/2012 | Kalavade |
| 8,255,971 B1 | 8/2012 | Webb et al. |
| 8,312,157 B2 | 11/2012 | Jakobsson et al. |
| 8,406,421 B2 | 3/2013 | Kamen et al. |
| 8,407,762 B2 | 3/2013 | Bidare |
| 8,732,170 B2 | 5/2014 | Kalavade |
| 8,755,297 B2 | 6/2014 | Kalavade |
| 8,769,651 B2 | 7/2014 | Grajek et al. |
| 8,793,760 B2 | 7/2014 | Raper |
| 8,832,799 B2 | 9/2014 | Matsimanis et al. |
| 8,935,381 B2 | 1/2015 | Kalavade |
| 8,958,313 B2 | 2/2015 | Kalavade |
| 9,027,119 B2 | 5/2015 | Bentley et al. |

(Continued)

OTHER PUBLICATIONS

Mohamed Al-Fairuz et al., "Multi-channel, Multi-level Authentication for More Secure eBanking," Conference Jan. 2010, pp. 1-8. (Year: 2010).*

(Continued)

*Primary Examiner* — Luu T Pham
*Assistant Examiner* — Canh Le
(74) *Attorney, Agent, or Firm* — Michael A. Springs; Moore & Van Allen PLLC; Nicholas C. Russell

(57) ABSTRACT

Embodiments of the present invention provide a multi-level authentication system to provide an additional level of authentication using phone application level data. The system extracts application level data and generates a questionnaire based on the extracted application level data. This questionnaire is transmitted to the device of the user by the system to receive an input related to the questionnaire. The system authorizes a request to execute an action upon validating the input received.

16 Claims, 5 Drawing Sheets

(56) References Cited

U.S. PATENT DOCUMENTS

| | | | |
|---|---|---|---|
| 9,083,527 B1 | 7/2015 | McCorkendale et al. | |
| 9,143,496 B2 | 9/2015 | Etchegoyen | |
| 9,147,061 B1 | 9/2015 | McClendon et al. | |
| 2005/0144451 A1* | 6/2005 | Voice | G06F 21/34 713/170 |
| 2007/0005967 A1* | 1/2007 | Mister | G06F 21/36 713/168 |
| 2011/0218983 A1* | 9/2011 | Chaney | G06F 17/30752 707/705 |
| 2013/0262857 A1* | 10/2013 | Neuman | H04L 63/08 713/155 |
| 2015/0227729 A1* | 8/2015 | Grigg | G06F 21/31 726/7 |
| 2015/0287164 A1* | 10/2015 | Kominar | G06T 3/0093 345/647 |
| 2016/0234160 A1* | 8/2016 | Bhupati | H04L 61/1594 |
| 2017/0046699 A1* | 2/2017 | Bravo | G06Q 20/405 |
| 2017/0078262 A1* | 3/2017 | Riddick | H04L 63/08 |
| 2017/0250968 A1* | 8/2017 | Licht | H04L 63/08 |
| 2018/0060542 A1* | 3/2018 | Anders | G06F 21/6245 |

OTHER PUBLICATIONS

Rohitash Kumar Banyal et al., "Multi-factor Authentication Framework for Cloud Computing," 2013 IEEE computer society, pp. 105-110. (Year: 2013).*

* cited by examiner

MULTI-LEVEL AUTHENTICATION USING PHONE APPLICATION LEVEL DATA

BACKGROUND

Investigation of unauthorized dealings can be a difficult process. Having to allocate resources to investigate the unauthorized dealings or the process of returning funds to the users of the entity when the investigation could not be completed may decrease the efficiency of the entity and processing devices of the entity. There is a need for additional authenticate for mobile based dealings to control the number of unauthorized dealings.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention address the above needs and/or achieve other advantages by providing apparatuses (e.g., a system, computer program product and/or other devices) and methods for providing a multi-level authentication for a device using application level data.

The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention comprise providing a computing system comprising a computer processing device and a non-transitory computer readable medium, where the computer readable medium comprises configured computer program instruction cone, such that when said instruction code operated by said computer processing device, said computer processing device performing certain operations to carry out the invention.

For sample, illustrative purposes, system environments will be summarized. The system the system comprising a memory device, at least one processor operatively coupled to the memory device, and a module in the memory device comprising computer instruction code executable by the at least one processor, and structured to cause the at least one processor to receive an authorization request to execute an action from a device of a user receive authentication credentials from the device of the user, wherein validating authentication credentials is a first level of authentication; extracting application level data associated with the device of the user; generating a questionnaire comprising a plurality of options based on the extracted application level data, wherein the plurality of options include at least one valid option derived from the extracted application level data and at least another invalid option not derived from the extracted application level data; in response to generating the questionnaire, transmitting control signals configured to cause a display of a user interface of the device of the user to display the questionnaire and to receive a selection input of one or more options of the plurality of options associated with the questionnaire; receive the one or more options from the device of the user; validate the one or more options based on the extracted application level data, wherein validating the one or more options is a second level of authentication; and in response to successful validation of the option, authorizing the request and transmit control signals configured to cause the device of the user to execute the action.

In some embodiments, the action comprises at least one of a funds transfer, an international transfer of funds with delivery instructions to agents delivering the funds physically at a drop off location, viewing of an account summary, a deposit, a withdrawal, and viewing a receipt.

In some embodiments, the generated questionnaire is saved in a database of an entity, wherein only the valid option associated with the questionnaire is stored in the database.

In some embodiments, the device of the user is a registered device of the user, wherein the identity of the registered device is stored in the database of the entity In some embodiments, successful validation of the option comprises: comparing the option received from the user and the valid option stored in the database; and determining a match between the option received from the user and the valid option stored in the database.

In some embodiments, failure of successful validation of the option comprises: comparing the option received from the user and the valid option stored in the database; and determining there is no match between the option received from the user and the valid option stored in the database.

In some embodiments, the computer instruction code is further structured to cause the at least one processor to, in response to determining that there is no match between the option received from the user and the valid option stored in the database, restrict execution of the action.

In some embodiments, the computer instruction code is further structured to cause the at least one processor to, in response to determining that there is no match between the option received from the user and the valid option stored in the database, generate a second questionnaire based on the extracted application level data.

In some embodiments, an alert is generated to notify the user after reaching a predetermined number of failed successful validation attempts.

In some embodiments, the computer instruction code is further structured to cause the at least one processor to, in response to reaching the predetermined number of failed successful validation attempts, freeze an account of the user to restrict execution of actions.

In some embodiments, freezing the account is performed by the user or an entity.

In some embodiments, the application level data is extracted and stored in a database before receiving the authorization request to execute the action.

In some embodiments, the database is updated based on detecting changes in the application level data.

BRIEF DESCRIPTION OF THE DRAWINGS

Figure 1:
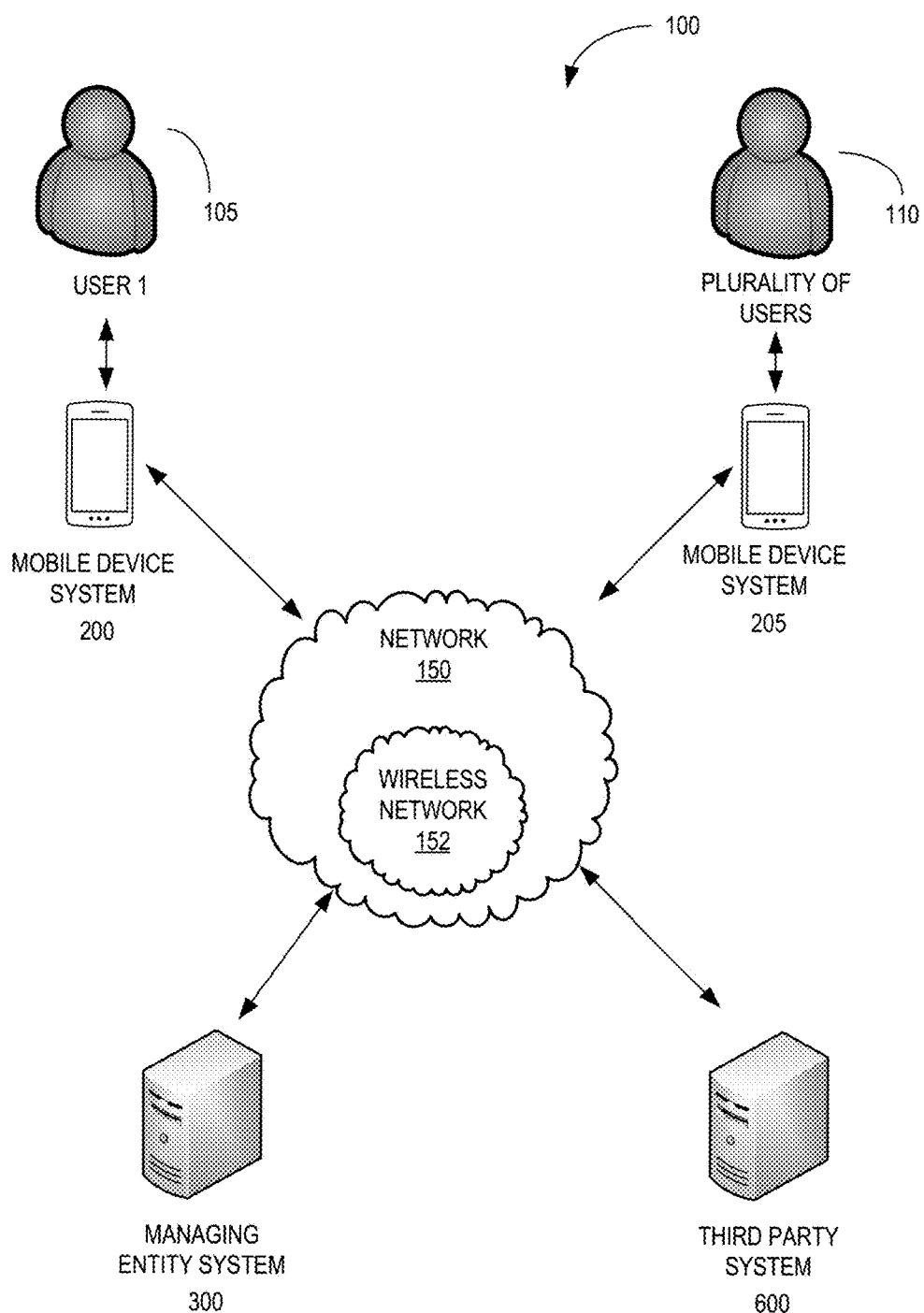
Figure 2:
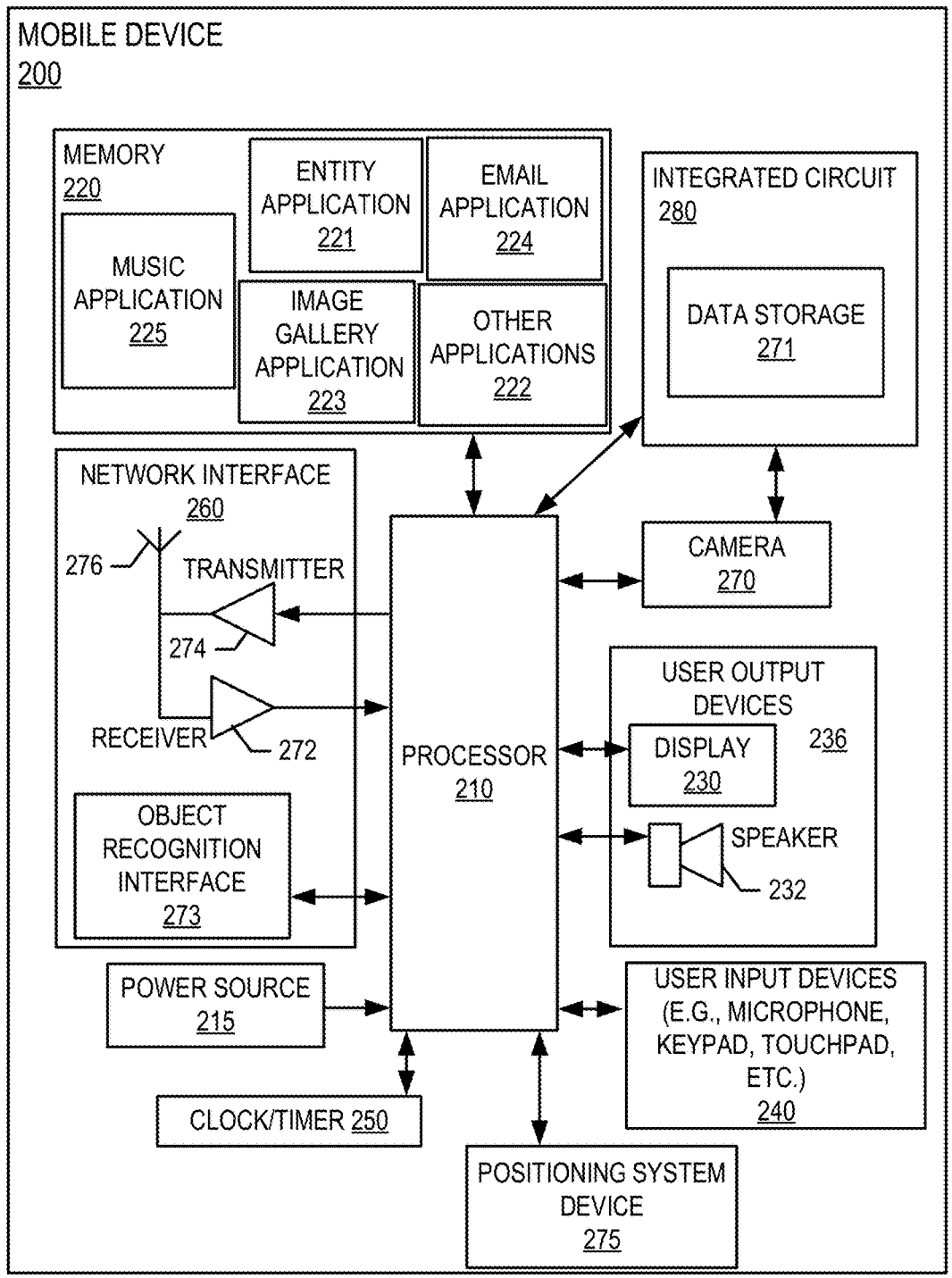
Figure 3:
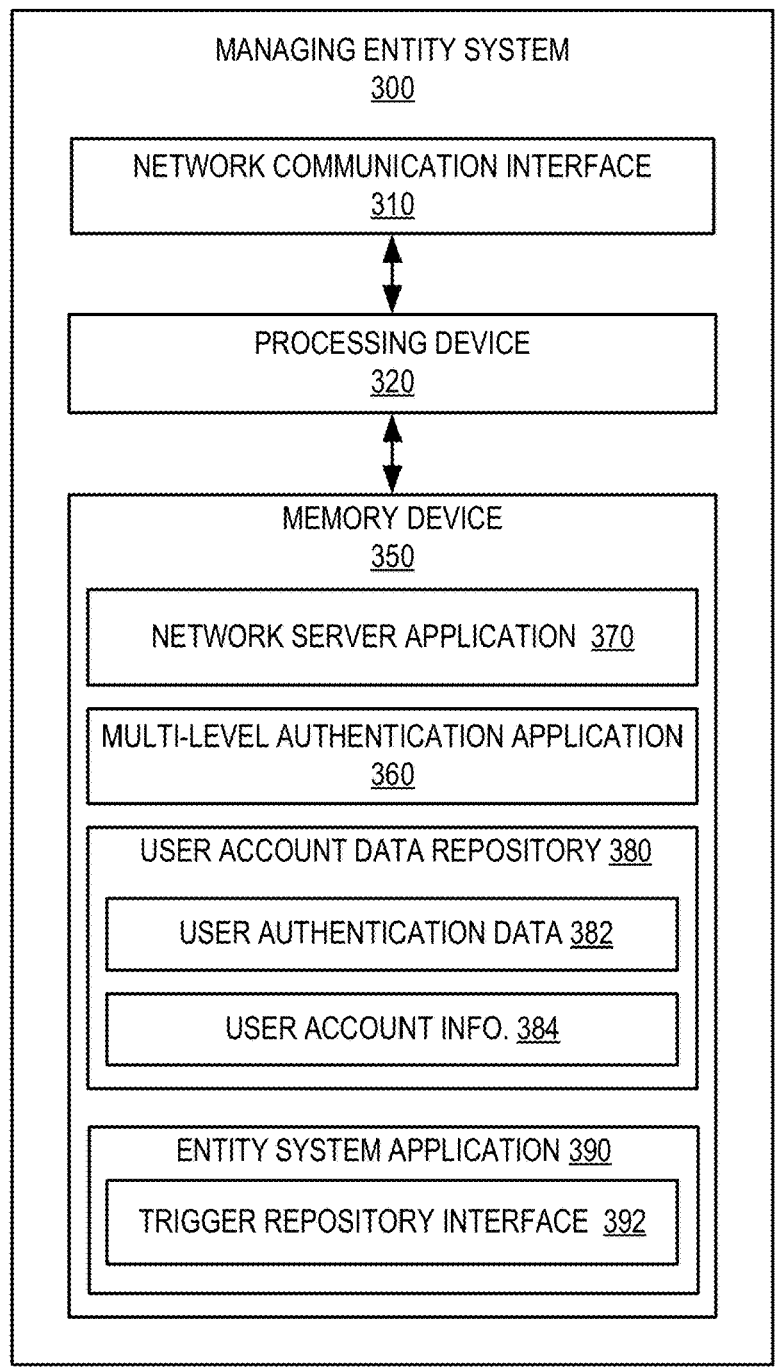
Figure 4:
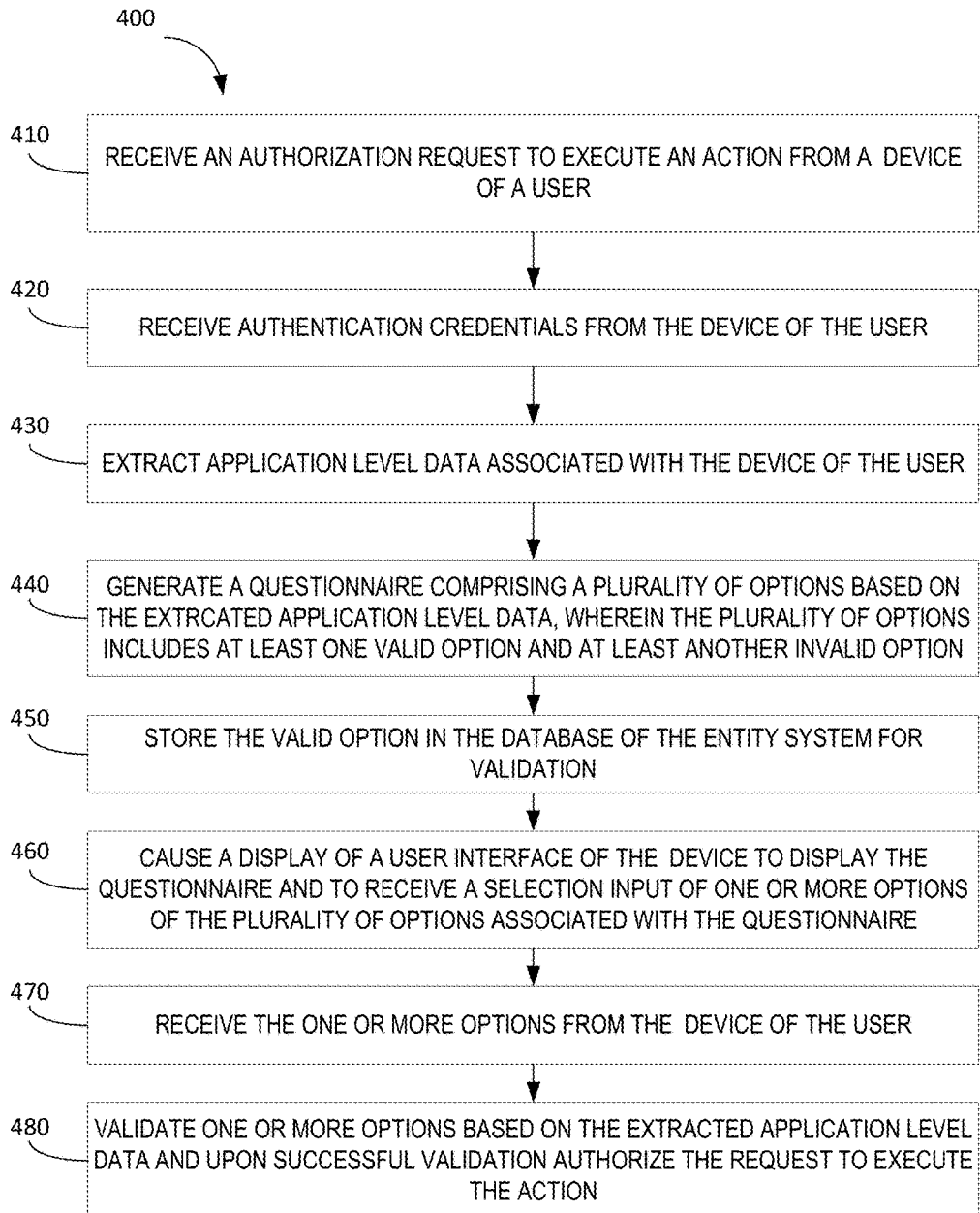
Figure 5:
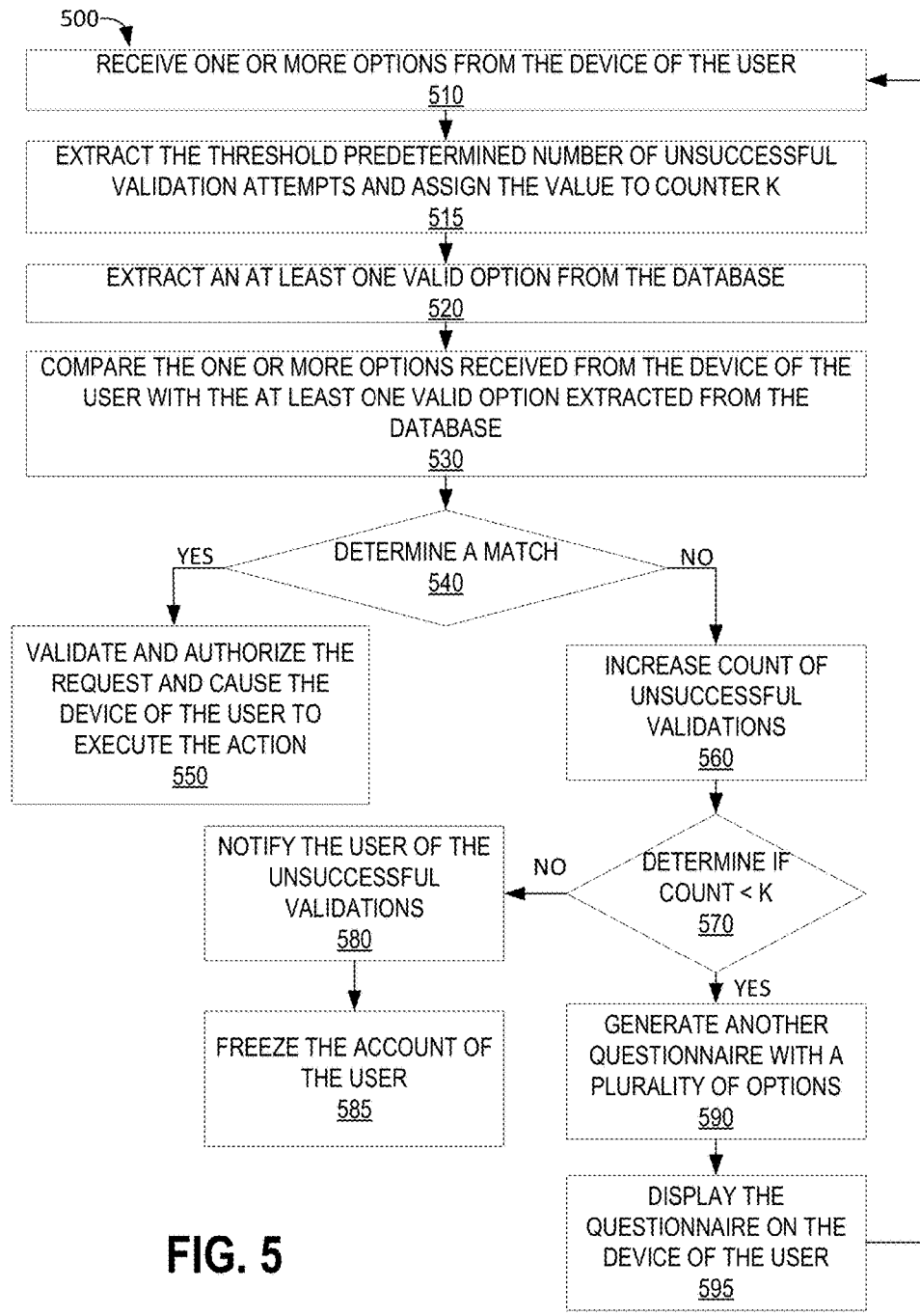

Having thus described some embodiments of the present invention in general terms, reference will now be made to the accompanying drawings, where:

FIG. 1 presents a block diagram illustrating the multi-level authentication system in accordance with embodiments of the invention;

FIG. 2 presents a block diagram illustrating the mobile computing device of the user illustrated in FIG. 1, in accordance with embodiments of the invention;

FIG. 3 presents a block diagram illustrating the managing entity system(s) of FIG. 1, in accordance with embodiments of the invention;

FIG. 4 illustrates a process flow for authorizing user based on the extracted application level data; and FIG. 5 illustrates a process flow for validating and authorizing the actions requested by the user.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, asset management firms, insurance companies and the like. Furthermore, embodiments of the present invention use the term "user" or "customer." It will be appreciated by someone with ordinary skill in the art that the user or customer may be a customer of the financial institution or a potential customer of the financial institution.

In accordance with embodiments of the invention, an "account" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user profile that includes information associated with the user, or the like. The account is associated with and/or maintained by the entity.

Many of the example embodiments and implementations described herein contemplate interactions engaged in by a resource user with a computing device and/or one or more resource access communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, personal computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Embodiments of the present invention provide a system, a method, and a computer program product for authenticating a user based on extracting application level data.

FIG. 1 presents an exemplary block diagram of the system environment 100 for implementing process flows described herein in accordance with embodiments of the present invention. As, illustrated the system environment 100 includes a user 105, a plurality of users 110, and a network 150. A user 105 of the system may be an individual account holder, an agent of the account holder, a customer of the financial institution, or any other entity capable of maintaining a financial account.

The environment includes a plurality of user devices 200 and 205 associated with a user 105 and a plurality of users 110. The user devices 200 and 205 may comprise any machine, apparatus, system, or the like that may be connected to and communicate with other devices over network 150, which in some instances may comprise a wireless telephone network 152. The network 150 may be a global area network (GAN), such as the Internet, a wide area network (WAN), a local area network (LAN), or any other type of network or combination of networks. The network 150 may provide for wireline, wireless, or a combination of wireline and wireless communication between devices in the network. In one embodiment, the network 150 includes the Internet.

At least one of the user devices may comprise a mobile device system for use by the user, wherein the system is in communication with one or more other devices and systems via the network 150. The mobile device systems 200 and 205 may be any portable device that employs a processor and memory and can perform computing functions, and that may be connected to or access network 150. As used herein, the mobile device system 200 may comprise any mobile communication device, such as a cellular telecommunications device (i.e., a cell phone or mobile phone), personal digital assistant (PDA), a mobile Internet accessing device, or other mobile device. The mobile device system 200 may be connected to a network by wireless access such as wireless local area network (WLAN) such as Wi-Fi based on the Institute of Electrical and Electronics Engineers' (IEEE) 802.11 standards, Bluetooth short-wavelength Ultra high frequency (UHF) radio waves in the Industrial, Scientific, Medical (ISM) band from 2.4 to 2.485 GHz or other wireless access technology.

In general, the mobile device system 200 is configured to connect with network 150 to allow the user to gain access to the online entity account managed by the managing entity system 300. In some embodiments, the online entity account may be managed by a third party system 600. Other systems. Devices, servers, or the like may also be included in the system environment 100, such as but not limited to entity systems such as financial institution systems, which maintain the account of the user 105, and third party systems, which may facilitate the transactions of the user 105 by providing hardware and/or applications, or may be merchant systems that receive the requests for the transactions directly from the user or form the entity systems.

FIG. 2 provides a block diagram illustrating a user's mobile device system 200 of FIG. 1 in more detail, in accordance with embodiments of the invention. In one embodiment of the invention, the mobile device system 200 is a mobile telephone. However, it should be understood that a mobile telephone is merely illustrative of one type of mobile device system 200 that may benefit from, employ, or otherwise be involved with embodiments of the present invention and, therefore, should not be taken to limit the scope of embodiments of the present invention. Other types of mobile device systems 200 may include portable digital assistants (PDAs), pagers, mobile televisions, gaming devices, laptop computers, cameras, video recorders, audio/video player, radio, Global Positioning System (GPS) devices, or any combination of the aforementioned.

Some embodiments of the mobile device system 200 include a processor 210 communicably coupled to such devices as a memory 220, user output devices 236, user input devices 240, a network interface 260, a power source 215, a clock or other timer 250, a camera 270, and a positioning system device 275. The processor 210, and other processors described herein, generally include circuitry for implementing communication and/or logic functions of the mobile device system 200. For example, the processor 210 may include a digital signal processor device, a microprocessor device, and various analog to digital converters, digital to analog converters, and/or other support circuits. Control and signal processing functions of the mobile device system 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application. The web browser application may then allow the mobile device system 200 to transmit and receive web content, such as, for example, location-based content and/or other web page content, according to a Wireless Application Protocol (WAP), Hypertext Transfer Protocol (HTTP), and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device system 200 may be configured to operate with one or more air interface standards, communication protocols, modulation types, and access types. By way of illustration, the mobile device system 200 may be configured to operate in accordance with any of a number of first, second, third, and/or fourth-generation communication protocols and/or the like. For example, the mobile device system 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with Long Term Evolution (LTE) protocols, with 3GPP protocols and/or the like. The mobile device system 200 may also be configured to operate in accordance with non-cellular communication mechanisms, such as via a wireless local area network (WLAN) or other communication/data networks.

As described above, the mobile device system 200 has a user interface that is, like other user interfaces described herein, made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device system 200 to receive data from a user such as the first user 105, may include any of a number of devices allowing the mobile device system 200 to receive data from a user, such as a keypad, keyboard, touch-screen, touchpad, microphone, mouse, joystick, other pointer device, button, soft key, and/or other input device(s). The user interface may also include a camera 270, such as a digital camera.

The mobile device system 200 may also include a positioning system device 275 that is configured to be used by a positioning system to determine a location of the mobile device system 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device system 200. In other embodiments, the positioning system device 275 includes a proximity sensor or transmitter, such as a Radio-frequency identification (RFID) tag, that can sense or be sensed by devices known to be located proximate a merchant or other location to determine that the mobile device system 200 is located proximate these known devices. Such information may be used by embodiments of the invention in order to demonstrate completion or partial completion of one or more activities associated with a smart contract.

The mobile device system 200 further includes a power source 215, such as a battery, for powering various circuits and other devices that are used to operate the mobile device system 200. Embodiments of the mobile device system 200 may also include a clock or other timer 250 configured to determine and, in some cases, communicate actual or relative time to the processor 210 or one or more other devices.

The mobile device system 200 also includes a memory 220 operatively coupled to the processor 210. As used herein, memory includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processor 210 to implement the functions of the mobile device system 200 and/or one or more of the process/method steps described herein. For example, the memory 220 may include such applications as an entity application 221, Email application 224, music application 225, image gallery application 223, and/or other mobile based applications 222. These applications also typically provide a graphical user interface (GUI) on the display 230 that allows the first user 105 to communicate with the mobile device system 200, the managing entity system(s) 300, and/or other devices or systems. In other embodiments of the invention, the first user 105 interacts with the managing entity system(s) 300 via the entity application 221.

The memory 220 can also store any of a number of pieces of information, and data, used by the mobile device system 200 and the applications and devices that make up the mobile device system 200 or are in communication with the mobile device system 200 to implement the functions of the mobile device system 200 and/or the other systems described herein. For example, the memory 220 may include such data as user authentication information, and the like.

FIG. 3 provides a block diagram illustrating the managing entity system(s) 300, in greater detail, in accordance with embodiments of the invention. As illustrated in FIG. 3, in one embodiment of the invention, the managing entity system(s) 300 include one or more processing devices 320 operatively coupled to a network communication interface 310 and a memory device 350. In certain embodiments, the managing entity system(s) 300 are operated by a first entity, such as a financial institution, while in other embodiments, the managing entity system(s) 300 are operated by any entity other than a financial institution.

It should be understood that the memory device 350 may include one or more databases or other data structures/repositories. The memory device 350 also includes computer-executable program code that instructs the processing device 320 to operate the network communication interface 310 to perform certain communication functions of the managing entity system(s) 300 described herein. For example, in one embodiment of the managing entity system(s) 300, the memory device 350 includes, but is not limited to, a network server application 370, a multi-level authentication application 360, a customer account data repository 380 which includes customer authentication data 382 and customer account information 384, an entity system application 390 which includes a trigger repository interface 392, and other computer-executable instructions or other data. The computer-executable program code of the network server application 370, the multi-level authentication application 360, or the entity system application 390 may instruct the processing device 320 to perform certain logic, data-processing, and data-storing functions of the managing entity system(s) 300 described herein, as well as communication functions of the managing entity system(s) 300.

In one embodiment, the user account data repository 380 includes customer authentication data 382 and user account information 384. The network server application 370, the multi-level authentication application 360, and the mobile banking application 390 are configured to invoke or use the customer account information 384, and the customer authentication data 382, when authenticating a user to the managing entity system(s) 300.

As used herein, a "communication interface" generally includes a modem, server, transceiver, and/or other device for communicating with other devices on a network, and/or a user interface for communicating with one or more customers. Referring again to FIG. 2, the network communication interface 310 is a communication interface having one or more communication devices configured to communicate with one or more other devices on the network 150, such as the mobile device system 200 or the like and the other third party systems 600. The processing device 320 is configured to use the network communication interface 310 to transmit and/or receive data and/or commands to and/or from the other devices connected to the network 150.

In some embodiments of the present invention, the processing device 320 of the managing entity system 300 is in network communication with mobile device system 200 using the network communication interface 310 and network interface 260. The processing device 320 may receive an authorization request to execute an action from processor 210 of the mobile device system 200. In response to receiving the authorization request, the multi-level authentication application 360 stored in the memory device 350 causes the processing device 320 to prompt the processor 210 of the mobile device to display a request for credentials and/or to be configured to receive input of credentials. In some embodiments, the multi-level authentication application may cause the processing device to prompt the processor 210 of the mobile device to provide any other form of authentication. The processor 210, may then send the authentication credentials automatically after accessing data storage 271 or when the user input the authentication credentials using user input devices 240. Upon receipt of authentication credentials by the processing device 320, the multi-level authentication application 360 may cause the validation of the authentication credentials by comparing the authentication credentials received from the user with the user authentication data 382 stored in the user account data repository 380. After successful validation of this first level of authentication, the multi-level authentication application 360 may extract the application level data from the memory 220 and cause the processing device 320 to generate a questionnaire which may then be sent to the processor 210. The processor 210 may cause the user output device 236 to display, at a user interface, the questionnaire using the display 230. The processor 210 can then cause the display 230 to be configured to receive a selection of an option related to the questionnaire from the user. In response to receiving the option, the processor 210 may transmit the option to the processing device 320. The multi-level authentication may then validate the option received and cause the processing device 320 to execute the action upon successful validation.

FIG. 4 illustrates a process flow for authenticating the user and authorizing the device of the user to perform actions. As shown in block 410, the system receives an authorization request to execute an action from a device of a user. The action may be defined as funds transfer between accounts, funds transfer to another user, an international transfer of funds with delivery instructions to agents delivering the funds physically to the drop off location, viewing of an account summary, a deposit, a withdrawal, and viewing a receipt or the like. The actions performed on the account may be a savings account, a checking account, an investment account, a debit/credit account, or the like. For example, the user may initiate a request on the device to transfer funds internationally from the savings account, wherein international transfer of funds comprises an agent physically delivering the funds to a drop off location or to another user at a specified delivery location. In some embodiments, the action may be change of profile settings, change of mailing address, and change of primary address or the like.

As shown in block 420, the system receives authentication credentials from the device of the user, wherein validating authentication credentials is a first level of authentication. For example, after sending a request to execute an action the user may provide authentication credentials. In some embodiments, the user provides authentication credentials after receiving a prompt from the system to provide user credentials and the system validates the authentication credentials, wherein validating authentication credentials is a first level of authentication. For example, the user requests the system to transfer funds from a checking account to a savings account, the system after receiving the request prompts the user to provide authentication credentials. Authentication credentials comprises at least one of a user authentication, a username, a password, a passcode, a personal identification number (PIN), a secret question, a received input, a biometric indicia, voice biometrics or the like. In some embodiments, the first level of authentication may be any form of authentication. For example, the system determines that the user is logged into a social media application on the user device and authenticates the user. In some other embodiments, the system may authenticate the user by verifying the identity of the device with the identity of the registered device of the user, wherein registered device is the device associated with the contact number of the user stored in the database of an entity. For example, the user may initiate a request to execute an action on the user device and upon receiving the request, the system validates the user device by comparing the identity of the device with the identity of registered device stored in the database of the system. In some embodiments, the first level of authentication may be any form of authentication.

As shown in block 430, the system extracts application level data in response to completing the first level of authentication. Application level data may be extracted from music application, image gallery application, web browser application, email application, usage tracking application, or the like. For example, the system extracts all the data related to music application including the top song played, favorite playlist, favorite song, or the like. In some embodiments, the system accesses the application usage data of all applications installed on the device including the most commonly used application or the like from the usage tracking application. In some embodiments, the system extracts application level data after receiving consent from the user. For example, the system extracts application level data from an email application after determining if the user has provided consent to extract the data from the device of the user. In some embodiments, the system extracts data after determining if the user has registered for an additional layer of authentication.

As shown in block 440, the system generates a questionnaire based on the extracted application level data, wherein the questionnaire comprises a plurality of options including at least one valid option derived from the extracted application level data and at least another invalid option not derived from the application level data. For example, in response to extracting the application level data related to music application, generates a questionnaire about the favorite song on the device of the user including a plurality of options wherein one valid option is the song marked as a favorite song on the device of the user and at least another invalid option which is not marked as a favorite song. In some embodiments, the system uses a search engine to identify similar invalid options related to the valid option. For example, if the system generates a questionnaire related to a favorite song on the device of the user, the system identifies similar songs related to the song which is marked as favorite song on the device of the user. In some embodiments, the system generates plurality of options based on the extracted application level data. For example, if the system generates a questionnaire related to a favorite song on the device of the user, the system generates a plurality of options from the extracted music application level data, including a valid option marked as a favorite song and at least another invalid option not marked as a favorite song from the same play list or a different play list.

In some embodiments, the system generates a questionnaire by accessing the account activity. For example, the system accesses the transactions linked to the account of the user and creates a questionnaire related to the most recent transaction including a plurality of options comprising a valid option which is the most recent transaction and at least another invalid option which is the transaction from the past. In some embodiments, the system generates a questionnaire based on the email activity. For example, the system generates a questionnaire related to the most recent email conversation including a plurality of options comprising a valid option with the subject matter of the most recent conversation and at least another invalid option with the subject matter of a conversation from last month. As another example, the system accesses the image gallery application level data and generates a questionnaire related to the most recent picture including a plurality of options comprising a valid option with the most recent picture from the image gallery and at least another invalid option with an image from last month.

In some embodiments, generating a questionnaire based on the data extracted from the image gallery application further comprises image obfuscation. In some embodiments, in response to generating the questionnaire comprising plurality of options including the valid option, the system determines if the valid option has been previously utilized by the user. For example, the system generates a questionnaire about the most recently visited website comprising a valid option extracted from the web browser application and at least one invalid option, wherein the valid option may be a popover ad. To eliminate the possibility of generating a valid option the user is not aware of or may not easily recognize, the system verifies if the website has been visited more than a predetermined number of times.

In some embodiments, the system accesses the Global Positioning System (GPS) of the device to identify the route taken by the user on a daily basis and generates a questionnaire related to the most frequently used route. In some embodiments, the system accesses the GPS of the device to identify the places visited by the user and generates a questionnaire related to the most recent visit during vacation.

In some embodiments, the system generates a plurality of options with more than one valid options. For example, the system extracts application level data from the music application and generates a questionnaire related to favorite song including a plurality of options with two options marked as a favorite songs in the music application on the device of the user and at least another option not marked as a favorite song in the music application on the device of the user. Alternatively, the system can generate a questionnaire related to favorite song with a plurality of options including two options marked as favorite songs on the device of the user and at least another option from same genre not present on the device of the user.

As shown in block 450, the system stores the valid option in the database of the entity system for validation. In some embodiments, the system also stores the questionnaire along with the plurality of options in the database of the entity system. In some embodiments, the system maintains a log of the generated questionnaires. In some embodiments, the system deletes the questionnaire and the valid option stored in the database immediately after the completion of the validation process. In some embodiments, the system generates a token associated with the valid option and stores the token in the database of the entity server for the purpose of validation, wherein the token masks the valid option.

As shown in block 460, the system transmits control signals configured to cause a display of a user interface of the device of the user to display the generated questionnaire and to receive a selection input of one or more options of the plurality of options associated with the questionnaire. For example, the system displays the questionnaire including the plurality of options with a check box or radio button for each of the plurality of options and a submit button to send the selected one or more options to the entity system. In some embodiments, the system uses the process of encryption and decryption for displaying the generated questionnaire, wherein the process of encryption and decryption secures the data of the user. For example, the system decrypts the questionnaire and the user of the entity may enter a passcode for retrieving an encryption key to encrypt the questionnaire.

Next, as shown in block 470, the system receives the one or more options from the device of the user and validates the one or more options based on the extracted application level data. As shown in block 480, the system upon successful validation authorizes the request to execute the action. For example, the system upon receiving an option of the favorite song selected by the user from one or more options of songs displayed on the device, validates the favorite song option selected by the user and performs the action requested by the user only when the process of validation is successful. In another example, the system initiates the physical transfer of funds to the drop off location upon successful validation. This second level of authentication provides an extra layer of security to prevent unauthorized transactions. In some embodiments, failure of successful validation comprises restricting the execution of the action requested by the device of the user.

In some embodiments, the system extracts the application level data before receiving an authorization request to execute an action. The system extracts the application level data and generates questionnaire with a plurality of options with at least one valid option and at least another invalid option derived from the extracted application level data. In some embodiments, the system stores the generated questionnaire and the plurality of options in the database of the entity system. In some embodiments, the system also stores the valid option in the database of the entity system for the purpose of validation. This process improves the processing speed of authorizing a request thereby improving the efficiency of the system. For example, the system extracts the application level data of the music application, generates a questionnaire related to the favorite song comprising a plurality of options including at least one valid option and at least another invalid option, stores the generated questionnaire including the plurality of options in the database of the entity system before receiving an authorization request to perform international transfer of funds. In some embodiments, the system also stores the valid option or correct option which is marked as the favorite song on the device of the user in the database for the purpose of validation. For example, after receiving the authorization request from the user device to perform international transfer of funds, the system extracts the questionnaire related to the favorite song from the database and causes the display of the user interface of the device of the user to display the questionnaire and to receive the selection input of one or more options of the plurality of options associated with the questionnaire thereby reducing the processing time of authorizing a request.

In some embodiments, the system deletes the questionnaire comprising the plurality of options and the valid option stored in the database of the entity server immediately after the completion of the validation process. In some embodiments, the system stores the questionnaire comprising the plurality of options and the valid option in a decrypted format to prevent exposure of sensitive information and erases the decrypted version of questionnaire comprising the plurality options immediately after completion of validation process. Therefore, the system may quickly retrieve previously used questions from an earlier questionnaire in future user authentication processes.

In some embodiments, the system continuously monitors the device of the user to detect any changes in the application level data. Upon detecting a change in the application level data, the system updates the questionnaire or generates a new questionnaire and stores the updated questionnaire in the database of the entity system in a decrypted format. The system after receiving an authorization request from the device of the user, extracts the questionnaire from the database and causes the display of a user interface of the device of the user to display the questionnaire extracted from the database of the entity system in a decrypted format. After receiving a passcode to retrieve the encryption key, the questionnaire is displayed on the user device in an encrypted format. For example, the system continuously monitors the device of user to detect any changes in the application level data. Upon detecting a change in the music application like the user changing or updating the favorite song, the system updates the valid option by decrypting the new valid option and stores the decrypted new valid option in the database of the system.

FIG. 5 illustrates a process flow for validating the option selected by the user, wherein validating the option is a second level of authentication. As shown in the block 510, the system receives one or more options from the device of the user. For example, in response to prompting the user to select a recent email conversation, the user selects the option having the most recent email conversation subject and submits the selected option to the system.

In block 515, the system extracts the value of threshold predetermined number of unsuccessful validation attempts and assigns the value to predetermined count "K". For example a value of X may be stored in the database of the entity system as the threshold number of unsuccessful validation attempts, the system extracts the value of X and assigns it to the counter K. In some embodiments, the threshold predetermined number of unsuccessful validation attempts may be set by the user. In some embodiments, the threshold predetermined number of unsuccessful validation attempts may be set by the entity.

Upon receiving the one or more options from the device of the user, the system as shown in block 520 automatically extracts the at least one valid option from the database of the entity system, wherein the system stores the at least one valid option in the database of the entity system for the purpose of validation immediately after generating the questionnaire. For example, the system generates a plurality of options including a "track 1" which is marked as a favorite song on the device of the user, a "track 2" and a "track 3" which are different from song 1 and in response to generating the plurality of options, the system stores the valid option "track 1" in the database for the purpose of validation. In some embodiments, the system generates tokens to mask the information used in generating the questionnaire comprising the valid option and stores the tokens in the database of an entity server.

Next, in block 530, the system compares the one or more options received from the device of the user with at least one valid option extracted from the database of the entity system and determines if the one or more options received from the device of the user match the one or more options stored in the database of the entity system as shown in block 530.

As shown in block 550, in response to determining a match between the option received from the user and valid option extracted from the database, the system validates the option selected by the user to authorize the request and cause the device of the user to execute the action. If the system determines that the one or more options received from the user do not match the one or more options extracted from the database of the entity system, the system increases the count of unsuccessful validations. For example, the system displays a questionnaire to select the most recent picture along with "picture 1", "picture 2", and "picture 3" as three obfuscated JPEG options, generates a token for "picture 2" and stores the token in the database, wherein "picture 2" is the most recent picture based on the extracted application level data. Upon receiving "picture 1" as the user selection, the system compares "picture 1" with the token related to "picture 2" stored in the database and determines they do not match and considers it as an unsuccessful validation. The system then increases the count of unsuccessful validations by 1 as shown in block 560. In some embodiments, the count has an initial value of 0. In some other embodiments, the count has an initial value of more or less than 0. In some embodiments, the system increases the count by 1. In alternate embodiments, the system increases the count by more than 1, upon determining an unsuccessful validation.

Next as shown in block 570, the system checks if the count of the number of unsuccessful transactions is less than a predetermined count "K". The predetermined count K as shown in block 570, has a value which is assigned in block 515. In some embodiments, the predetermined count limit is set by the user. In some other embodiments, the predetermined count limit is set by the system. In alternate embodiments, the predetermined count limit is fixed by the entity holding the account of the user.

If the system determines the count of unsuccessful transactions to be more than the predetermined count limit, the system as shown in block 580 notifies the user of the unsuccessful validation attempts and freezes the account of the user as shown in block 585. In some embodiments, the mode of notifying the user may be a default mode of communication selected by the entity. In some other embodiments, the mode of notifying may be selected by the user. In alternate embodiments, the mode of notifying may be selected by the system.

If the system determines the count of unsuccessful transactions to be less than the predetermined count, the system as shown in block 590, generates another questionnaire different from the previously generated questionnaires. In some embodiments, the system extracts the application level data again before generating the questionnaire different from the first questionnaire. In some other embodiments, the system questionnaire different from the first questionnaire based on the previously extracted data. For example, if the system extracts application level data related to the music application to generate first questionnaire, the system uses the same extracted application level data to generate another questionnaire different from the first questionnaire. The system as shown in block 595 displays the new questionnaire on the device of the user and continues the process until it reaches block 580 or block 585.

In some embodiments, the secondary level of authentication may be used as an authentication method for accessing restricted web pages, gaining access to a device and/or the like. In some embodiments, the secondary level of authentication of the present invention may be used as a primary level of authentication. In some other embodiments, the secondary level of authentication described in the present invention may be used as a single level of authentication method.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with notifying a specialist of a malfeasance detection based on identification of a device signature.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for notifying a specialist of a malfeasance detection based on identification of a device signature, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for multi-level authentication for a device, the system comprising:
   a memory device;
   at least one processor operatively coupled to the memory device; and
   a module in the memory device comprising computer instruction code executable by the at least one processor, and structured to cause the at least one processor to:
      receive an authorization request to execute an action from a device of a user;
      receive authentication credentials from the device of the user, wherein validating authentication credentials is a first level of authentication;
      extract application level data associated with at least one of an image gallery application, a music application, an email application, and a usage tracking application installed on the device of the user;
      generate a questionnaire comprising a plurality of options based on the extracted application level data associated with at least one of the image gallery application, the music application, the email application, and the usage tracking application installed on the device of the user, wherein the plurality of options include at least one valid option derived from the extracted application level data and at least another invalid option not derived from the extracted application level data, wherein the generated questionnaire is saved in a database of an entity, wherein only the at least one valid option associated with the questionnaire is stored in the database;
      obfuscate one or more images associated with the image gallery application;
      transmit control signals configured to cause a display of a user interface of the device of the user to display the questionnaire and the one or more obfuscated images and to receive a selection input of one or more options of the one or more obfuscated images associated with the questionnaire;
      receive the one or more options from the device of the user;
      validate the one or more options based on the extracted application level data, wherein validating the one or more options is a second level of authentication; and
      in response to successful validation of the one or more options, authorize the request and transmit control signals configured to cause the device of the user to execute the action,
      wherein failure of successful validation of the one or more options comprises: comparing the one or more options received from the user and the at least one valid option stored in the database; and determining there is no match between the one or more options received from the user and the at least one valid option stored in the database.

2. The system of claim 1, wherein the device of the user is a registered device of the user, wherein the identity of the registered device is stored in the database of an entity.

3. The system of claim 1, wherein successful validation of the one or more options comprises: comparing the one or more options received from the user and the at least one valid option stored in the database; and determining a match between the one or more options received from the user and the at least one valid option stored in the database.

4. The system of claim 1, wherein the action comprises at least one of a funds transfer, an international transfer of funds with delivery instructions to agents delivering the funds physically at a drop off location, viewing of an account summary, a deposit, a withdrawal, and viewing a receipt.

5. The system of claim 1, wherein the computer instruction code is further structured to cause the at least one processor to, in response to determining that there is no match between the one or more options received from the user and the at least one valid option stored in the database, restrict execution of the action.

6. The system of claim 1, wherein the computer instruction code is further structured to cause the at least one processor to, in response to determining that there is no match between the one or more options received from the user and the at least one valid option stored in the database, generate a second questionnaire based on the extracted application level data.

7. The system of claim 1, wherein an alert is generated to notify the user after reaching a predetermined number of failed successful validation attempts.

8. The system of claim 7, wherein the computer instruction code is further structured to cause the at least one processor to, in response to reaching the predetermined number of failed successful validation attempts, freeze an account of the user to restrict execution of actions.

9. The system of claim 8, wherein freezing the account is performed by the user or an entity.

10. The system of claim 1, wherein the application level data is extracted and stored in a database before receiving the authorization request to execute the action.

11. The system of claim 10, wherein the database is updated based on detecting changes in the application level data.

12. A computer implemented method for providing multi-level authentication for a device, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving an authorization request to execute an action from a device of a user;

receiving authentication credentials from the device of the user, wherein validating authentication credentials is a first level of authentication;

extracting application level data associated with at least one of an image gallery application, a music application, an email application, and a usage tracking application installed on the device of the user;

generating a questionnaire comprising a plurality of options based on the extracted application level data associated with at least one of the image gallery application, the music application, the email application, and the usage tracking application installed on the device of the user, wherein the plurality of options include at least one valid option derived from the extracted application level data and at least another invalid option not derived from the extracted application level data, wherein the generated questionnaire is saved in a database of an entity, wherein only the at least one valid option associated with the questionnaire is stored in the database;

obfuscating one or more images associated with the plurality of options the image gallery application;

transmitting control signals configured to cause a display of a user interface of the device of the user to display the questionnaire and the one or more obfuscated images and to receive a selection input of one or more options of the one or more obfuscated images associated with the questionnaire;

receiving the one or more options from the device of the user;

validating the one or more options based on the extracted application level data, wherein validating the one or more options is a second level of authentication; and in response to successful validation of the one or more options, authorizing the request and transmit control signals configured to cause the device of the user to execute the action, wherein failure of successful validation of the one or more options comprises: comparing the one or more options received from the user and the at least one valid option stored in the database; and determining there is no match between the one or more options received from the user and the at least one valid option stored in the database.

13. The computer implemented method of claim 12, wherein successful validation of the option comprises: comparing the one or more options received from the user and the at least one valid option stored in the database; and determining a match between the one or more options received from the user and the at least one valid option stored in the database.

14. The computer implemented method of claim 12, wherein the action comprises at least one of a funds transfer, an international transfer of funds with delivery instructions to agents delivering the funds physically at a drop off location, viewing of an account summary, a deposit, a withdrawal, and viewing a receipt.

15. A computer program product for providing multi-level authentication for a device, the computer program product comprising at least one non-transitory computer readable medium comprising computer readable instructions, the instructions comprising instructions for:

receiving an authorization request to execute an action from a device of a user;

receiving authentication credentials from the device of the user, wherein validating authentication credentials is a first level of authentication;

extracting application level data associated with at least one of an image gallery application, a music application, an email application, and a usage tracking installed on the device of the user;

generating a questionnaire comprising a plurality of options based on the extracted application level data associated with at least one of the image gallery application, the music application, the email application, and the usage tracking application installed on the device of the user, wherein the plurality of options include at least one valid option derived from the extracted application level data and at least another invalid option not derived from the extracted application level data, wherein the generated questionnaire is saved in a database of an entity, wherein only the at least one valid option associated with the questionnaire is stored in the database;

obfuscating one or more images associated with the image gallery application;

transmitting control signals configured to cause a display of a user interface of the device of the user to display the questionnaire and the one or more obfuscated images and to receive a selection input of one or more options of the one or more obfuscated images associated with the questionnaire;

receiving the one or more options from the device of the user;

validating the one or more options based on the extracted application level data, wherein validating the one or more options is a second level of authentication; and in response to successful validation of the option, authorizing the request and transmit control signals configured to cause the device of the user to execute the action, wherein failure of successful validation of the one or more options comprises: comparing the one or more options received from the user and the at least one valid option stored in the database; and determining there is no match between the one or more options received from the user and the at least one valid option stored in the database.

16. The computer program product of claim 15, wherein the action comprises at least one of a funds transfer, an international transfer of funds with delivery instructions to agents delivering the funds physically at a drop off location, viewing of an account summary, a deposit, a withdrawal, and viewing a receipt.

* * * * *